United States Patent Office 3,511,795
Patented May 12, 1970

3,511,795
FATTY ACID ESTER ADDUCT TREATED WITH AN ACIDIC ION EXCHANGE RESIN
Mary G. Brodie, Chicago, Ill., assignor to The Sherwin-Williams Company, Cleveland, Ohio, a corporation of Ohio
No Drawing. Filed June 24, 1966, Ser. No. 560,106
Int. Cl. C08f *47/22;* C08g *53/20;* C08j *1/12*
U.S. Cl. 260—23.7
12 Claims

ABSTRACT OF THE DISCLOSURE

Maleinized and fumarized adducts of esters of polyols and unsaturated fatty acids having good color properties and good drying properties are prepared by incorporating with the reaction mixture a cation exchange resin in the hydrogen form, preferably so that said resin is present during maleinization or fumarization, with or without treatment of the adduct with a peroxide and/or polybutadiene, with the further proviso that said resin is removed from the final product.

---

The present invention relates to novel paint vehicles and to a process for producing paint vehicles having improved properties.

In recent years latex paints have enjoyed great success as flat paints. Such products are quick drying and brushes and rollers that are used to apply the paint can be water cleaned. The public acceptance of these products has spurred efforts to produce semigloss or gloss enamel products having the advantages of latex paints. Up to now, however, these efforts have not been entirely successful.

It is an object of the present invention to provide semigloss or gloss enamels which have good color properties, which are relatively quick drying, but which still can be removed from brushes and rollers by water washing before they have dried.

It is a further object to provide semigloss or gloss enamels which have improved hydrophilicity and water resistance properties.

Another object of the invention is to provide an improved water dispersed gloss or semigloss paint.

Other objects will become apparent to those skilled in the art from the following detailed description of the invention.

In general, the present invention involves the discovery that maleic anhydride or fumaric acid adducts of esters of resinous polyols can be improved significantly as paint vehicles where the esters are treated with acidic ion exchange materials. It has been found that this treatment improves the color properties of the paint vehicle as well as the rate of drying and water resistance characteristics of the vehicle. It has further been found that a paint vehicle having improved hydrophilicity in addition to superior color properties, etc., is formed by combining the ion exchange treatment with the peroxide-polybutadiene treatment described below.

The paint vehicles which are treated in accordance with the subject invention are modified resinous polyols. The polyols which are to be modified in producing the paint vehicles include homopolymers of 9-oxatetracyclo 4.4.1$^{2,5}$0$^{1,6}$0$^{8,10}$ undecan 4 ol and have the following structural formula:

I 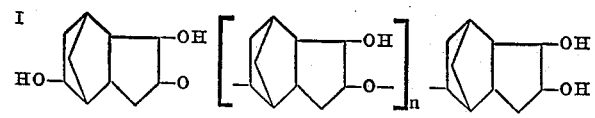

where $n$ is a whole number between 2 and 8 most often especially 12, as well as copolymers of styrene and allyl alcohol having the following structural formula:

II 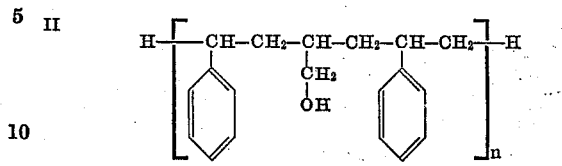

where $n$ is a whole number between 2 and 8 most often between 4 and 7, and epoxy resins having the following structural formula:

III 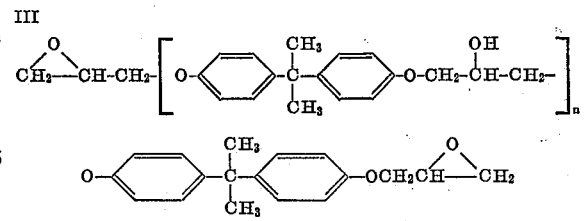

where $n$ is a whole number between 0 and 9 and most often between 0 and 4.

The hydroxyl content of the first named polyol varies between about 11.6% and 12.1%. In preparing the paint vehicle the polyol resin initially is esterified with an unsaturated fatty acid. It is desirable to esterify the available hydroxyl groups of the polyol. For this reason an excess of fatty acid is employed. The amount of fatty acid can range from about 5 to 50% excess, and most often will be at least 10% in excess. Esterification reaction is carried out at a temperature of about 350° F. to 550° F. In general, a solvent reflux system is employed using xylene, toluene, or the like as an azeotrope to carry off water.

The treatment of the paint vehicle with the acidic ion exchange agents preferably takes place after the polyols have been esterified. It is also possible, however, to add the ion exchange agents at any stage of the process. In one embodiment the ester is treated with the acidic ion exchange agent at the same time that a maleic anhydride adduct is being formed in the step to be described below.

The acidic ion exchange agent preferably is an acidic cation exchange resin such as Dowex 50, Dowex 50W, Amberlite IR-120, etc. These resins are strong acid resins which are prepared by the nuclear sulfonation of styrene-divinylbenzene beads. Such resins are capable of salt-splitting reactions. A suitable cation exchange resin for use in the present process is described in U.S. Pat 2,366,007. Other acidic cation exchange resins can also be used in the process. So-called microporous or macroreticular cation exchange resins are included in this group. A typical macroreticular ion exchange resin is Amberlyst 15, a sulfonic acid type based upon a styrene-divinyl-benzene copolymer. These resins have a high degree of true porosity while at the same time are rigid and subject to minimum volume changes when immersed or removed from solvents.

In treating the esterified polyol, a given amount of resin can be added to the heated polyol or ester with agitation. It is also possible to pass the ester through a bed of cation exchange resin.

After the treatment with the acidic ion exchange resin, during the treatment, the esterified polyol is reacted with maleic anhydride or furmaric acid to form a maleic fumaric adduct. A small amount of iodine (usually about 0.1% but in some instances up to 0.5% based on weight of the ester) is used as a catalyst. The range maleic anhydride or fumaric acid will be from about 0 15% based on the weight of the ester, while the preferred range is 8 to 12% with polyols I and III above. With polyol II the preferred range is from about 8 to %. Ordinarily, a glycol ether such as butoxyethanol or basic material is added to the system after the adduct is formed in order to open the maleic rings. This would be true of the fumaric adduct because of the acid groups.

A water soluble or water dispersible product is produced by reacting the vehicle with an alkaline material. Alkaline materials which can be used as solubilizing agents include lithium hydroxide monohydrate, ammonia, potassium hydroxide, sodium hydroxide, barium hydroxide, and amines which boil low enough to permit the formation of dry coatings (for example, dimethylethanolamine, methylamine, triethylamine, morpholine, methyl and N-morpholines). The alkaline material neutralizes the acid groups of the vehicle forming a salt which produces water solubility or dispersibility.

The alkaline material is added to the vehicle in the form of an aqueous dispersion or the vehicle is added to a water dispersion of the solubilizing agent in most cases. Dilution of the solubilizing agent in water is separately made. The vehicle and the base solution are then mixed by gradual addition of the base solution to the vehicle or vice versa. In either case simultaneous (with addition) agitation is necessary.

Inasmuch as the vehicle is amphoteric in solubility, it is desirable to provide a cosolvent during the solubilization step. Examples of suitable cosolvents include the methyl, ethyl and butyl ethers of ethylene glycol, methyl and butyl ethers of diethylene glycol, alkyl ethers of propylene glycol, etc. Glycols, glycol ether esters and glycol diethers also could find use as cosolvents. Subsequently, water is added to produce a product having about 30% to 40% by weight solids, preferably 33% to 37% by weight solids.

The following examples are illustrative of the present invention.

EXAMPLE 1

This example shows the preparation of an ester of polyol I described above. A quantity of 68.6 parts of fatty acid and 31.4 parts of resinous polyol I were added to a reaction vessel. To this was added 5% by weight of xylene as a reflux agent. The reaction vessel was equipped with an agitator, a temperature recording device, an inlet for inert gas, a condenser, and a water trap. The reaction mixture was heated slowly to 450° F. until the desired acid value of 10–16 was obtained. The resultant ester had a viscosity rating of Y, a color reading, an AV value of 16.0, and an NVM content of 96.5%.

EXAMPLE 2

This example shows the treatment of the ester in accordance with the subject invention as well as the subsequent formation of an anhydride adduct. To 100 parts ester solids prepared as described in Example 1, 2.6 parts of a strong acid cation exchange resin in the hydrogen form (Dowex 50W-X8) was added. The mixture was heated to 250° F. and held for 2 hours with agitation. After this time the mixture was filtered to remove the ion exchange resin. 11.3 parts of maleic anhydride was then added to 100 parts of the treated ester in a vessel equipped with an agitator, a reflux condenser, an inert gas source, and a thermometer. The mixture was heated to 212° F. with 0.1% iodine added (dispersed in minimum xylene) based on the ester weight. The temperature was then raised to 425° F. and held at this reading for 2 hours. The batch was cooled and butoxyethanol was added at 300° F. to yield 85% solids. The properties of the product (No. 2) are set forth in Table I which appears below.

EXAMPLE 3

A quantity of 11.4 parts of maleic anhydride and 2.7 parts of Dowex 50W-X8 were added to 100 parts ester solids prepared as described in Example 1. The adduct was then formed as is described in Example 2. After the addition of butoxy-ethanol, the batch was filtered to remove the cation exchange resin. This step was also carried out in the example set forth below. There was no real or significant color increase in this adduct. The properties of the product (No. 4) are set forth in Table I appearing below.

EXAMPLE 4

This example further illustrates the subject method of treating the polyol ester. In this process 1 part of Dowex 50W-X8 was added to 100 parts ester solids prepared as described in Example 1 along with 11.4 parts of maleic anhydride. Iodine (0.1% based on ester weight) was dispersed in a minimum of xylene and added to the reaction mixture at 212° F. Temperature was then raised to 425° F. and held at this reading for 2 hours. The batch was cooled and butoxyethanol was added at 300° F. to yield 85% solids. The properties of this product (No. 5) are described in Table I which appears below. At a solids level of 87.53% this adduct had a color of 9− (ester color 7+) whereas the control had a color of 14.

EXAMPLE 5

In this example 51.7 parts of soya fatty acid and 48.3 parts of resinous polyol II described above were added to a reaction vessel. Three (3) percent by weight xylene was then added for reflux. The reaction vessel was equipped with an agitator, a temperature recording device, an inlet for inert gas, a condenser, and a water trap. The reaction mixture was heated slowly to 460° F. at which point a blow was initiated. Heating was continued to 480° F. and held a minimum of 2 hours at 480° F. to an acid value of 10–14. The resulting ester had a viscosity of $Z-Z_7$, a color of 4, an acid value of 12.89, and an NVM of 95.57%.

EXAMPLE 6

8.4 parts maleic anhydride and 1 part Dowex 50W-X8 were added to 100 parts ester solids prepared as described in Example 5. The reaction vessel was equipped with an agitator, thermometer, reflux condenser, and an inert gas supply. The mixture was heated to 212° F. and 0.1% iodine (based on ester weight) dispersed in a minimum amount of xylene was added to the reaction mixture. The temperature was then raised to 425° F. and held at this reading for 2 hours. The batch was cooled and butoxyethanol was added at 300° F. to yield 87% solids. This product (No. 19 in Table I) had an ester color of 4 and an adduct color of 6 to 7.

EXAMPLE 7

The process described in Example 6 was repeated except that the amount of ion exchange material was lowered to 0.5 part and the amount of maleic anhydride was 8.3 parts. The properties of this product (No. 18) are set forth in the table below. As is apparent from the table, products 18 and 19 have improved color over products 16 and 17 where no treatment with ion exchange material was carried out.

In Table I numerous tests are set out using different levels of ion exchange materials. The results show that the use of the ion exchange material consistently improves the adduct color.

TABLE I—PROCESS FOR IMPROVING THE COLOR OF MALEINIZED VEHICLES

| Product | Additive | Concentration on ester solids percent | Treatment | Maleic conc. on ester solids, percent | Ester color | Adduct color | Acid value | NVM percent |
|---|---|---|---|---|---|---|---|---|
| 1 | None | | | 11.5 | 6 | 13 | 59.7 | 89.72 |
| 2 | Dowex 50WX-8 | 2.6 | Pretreat ester at 250°F. | 11.30 | 6 | 9 | 69.95 | 85.76 |
| 3 | None | | Control (but CHP treated) | 11.4 | 6- | 14 | 66.26 | 86.02 |
| 4 | Dowex 50WX-8 | 2.7 | ⎫ | 11.4 | 6- | 6+ | 82.78 | 84.72 |
| 5 | ___do___ | 1.0 | ⎬ Present during adduct formation. | 11.4 | 7- | 9- | 71.09 | 87.53 |
| 6 | ___do___ | 0.7 | ⎥ | 11.4 | 7+ | 10 | 70.61 | 87.09 |
| 7 | ___do___ | 0.3 | ⎭ | 11.4 | 6 | 11 | 69.56 | 86.59 |
| 8 | None | | Control, lower temperature used. | 10.0 | 8 | 12 | 61.39 | 87.81 |
| 9 | Dowex 50WX-8 | 1 | Present during adduct formation. | 10.0 | 8 | 9 | 52.72 | 88.84 |
| 10 | ___do___ | 1 | Present, but H₂O removed during adduct formation. | 10.0 | 8 | 10-11 | 61.10 | 88.04 |
| 11 | Predried Dowex 50WX-8. | 0.6 | Present (but predried) during adduct formation. | 10.0 | 8 | 10-14 | 59.97 | 89.04 |
| 12 | None | | | 8.3 | 8 | 13-14 | 51.85 | 82.45 |
| 13 | Amberlyst 15 | 1 | ⎫ | 8.3 | 8 | 11-12 | 50.96 | 82.04 |
| 14 | Amberlite IR 120 | 1 | ⎬ Present during adduct formation. | 8.3 | 8 | 9-10 | 51.78 | 84.83 |
| 15 | Dowex 50WX-8 | 1 | ⎭ | 8.2 | 8 | 8 | 56.14 | 82.15 |
| 16 | | | Control | 8.2 | 5 | 8 | 49.04 | 81.94 |
| 17 | | | Control—CHP treated | 8.4 | 4 | 8 | 51.95 | 88.39 |
| 18 | Dowex 50WX-8 | 0.5 | ⎱ Present during adduct formation. | 8.3 | 4 | 6 | 60.01 | 88.51 |
| 19 | ___do___ | 1.0 | ⎰ | 8.4 | 4 | 6-7 | 56.82 | 88.92 |

In the above table, Products 1 and 2 show that the pretreatment of the ester with the cation exchange resin and the removal of the resin before subsequent maleinization shows a definite improvement in color.

Products 3 to 7 show that a stabilizing effect is still apparent as the cation exchange resin concentration is decreased to 0.3% even though the highest maleic anhydride levels were used. The control (Product 3) was a typical adduct except that it was treated with cumene hydroperoxide which is usually at least as good as control.

Products 8 to 11 show that water is not essential for stabilization, although it enhances the effect. Product 9 is a typical cation exchange resin treatment. Product 10 had water removed (about 40% of that possible from the Dowex distilled over) during the maleinization with Dowex present, and Product 11 shows the effect of using a predried sample of Dowex containing only 2.64% water versus the original 52.23%. The control here was a maleic adduct processed at lower temperature (375° F. vs. 425° F.) which should also yield a better rather than poorer color. Since the same ester base is used for all, an improvement is apparent in all cases where the cation exchange resin was used.

Products 12 to 15 show the effect of other cation exchange agents. Amberlyst 15 contains no water and shows a reduction in color from 13–14 to 11–12. Amberlite IR 120 which is swollen with water, reduces the color to a 9–10 even at 2% higher vehicle solids. This resin is similar to Dowex 50WX-8 except that it has a smaller mesh size and is slightly less thermally stable (250° F. vs. 302° F.).

Products 16 to 19 show the usefulness of the present method with respect to polyol II. Control Product No. 17 was treated with 0.5% cumene hydroperoxide which usually yields at least as good a color as the untreated adduct. Again, adducts treated with the cation exchange resin had a lighter color.

In the preparations set out in the examples the adducts were solubilized in water by adding cosolvent, 20% by weight of the total adduct and 3% solubilizing agent by weight of this reduced adduct and sufficient water was added to yield a solution at approximately 34% solids. Any alkaline amine or alkali metal can be used as the solubilizing agent as was described above. The drying tests were run from these water solutions using common drier metal additives.

As was pointed out above, the ion exchange material that is used to treat the vehicle is (preferably is) a cation exchange resin in the free hydrogen form. It is also possible to use weak acid cation exchange resins which contain carboxyl groups as the functional sites. These resins are not capable of splitting neutral salts but are of considerable value in removing basic materials from liquids.

The amount of cation exchange material based on the weight of the ester can vary from about 0.1% on up to 2.5% or higher. Preferably, at least about 0.3% of cation exchange material is used based on the weight of the ester.

EXAMPLE 8

This example shows the preparation of a modified adduct of an ester of polyol III described above.

To a reaction vessel 68.9 parts of safflower fatty acid and 31.1 parts of epox yresin, Epon 1001, were charged. To this was added 3% by weight xylene as the reflux solvent. The reaction vessel was equipped with an inlet for inert gas, a trap for water of reaction, a condenser and a temperature recording device. The reaction mixture was heated to 500° F. and held until the desired acid value was obtained, generally 22 to 28. The reaction mixture was then cooled to 350° F., the water trap removed and replaced by a reflux condenser. Then 8.25 parts of maleic anhydride and 0.1% iodine (dispersed in a minimum amount of xylene) on ester (solids) weight were added. The temperature was then raised to 410° F. and maintained for 3 hours. Odorless mineral spirits was added to 90–93% solids after cooling the reaction mixture to approximately 300° F. The resultant adduct had a color reading of 8–.

The addition of 1% cation exchange resin (Dowex 50W–X8) along with 8.25 parts of maleic anhydride in preparing the adduct as shown above produced a vehicle having a color reading of 7.

The invention is applicable to any maleinized or fumarized fatty acid ester of a lower molecular weight polyol. The polyols are set forth above merely for illustrative purposes.

As is described above, the polyol resin is esterified with an excess of an unsaturated fatty acid. The excess amount of fatty acid can range from about 5 to 50% excess. The fatty acids can be those contained in soybean oil, safflower oil, linseed oil, dehydrated castor oil, cotton seed oil, tall oil, and the like. Specific fatty acids include oleic acid, linoleic acid, and the like. The polyols are generally esterified at temperatures of from about 350° F. to 550° F., and most often at a temperature of about 390° F. to 500° F. Rosin acids are difficult to esterify below 500° F. For this reason if a tall oil is used having a high rosin content a temperature in excess of 500° F. will be needed in most instances.

The maleinized or fumarized ester can be dissolved in a wate insoluble organic solvent (e.g., xylene or mixtures containing mineral spirits) to produce a coating composition which can be applied to objects made of wood, plaster, steel or other metal or nonmetal surfaces and dried by baking in a conventional manner. Driers, for example, cobalt naphthenate, can be added to facilitate drying and to provide compositions which will dry to ich at lower temperatures or at ordinary room temperatures.

The invention is particularly important, however, in preparation of water dispersed coating compositions of the type previously described which can be applied to many different types of surfaces, including metal, wood, or plaster.

Any of the foregoing coating compositions can be prepared with or without pigments.

It should be emphasized that the paint vehicle can be used in a solvent or water system without opening the anhydride ring with an alcohol. The ring may be opened with an alcohol and the subsequent formation of a salt makes the material water dispersible. Solvents such as mineral spirits can be used for dilution and later incorporation into a water-soluble vehicle. The vehicle has been solubilized directly in water with a later addition of solvent.

In a preferred embodiment of the invention the treatment of the paint vehicle with a cation exchange resin is combined with a treatment with a peroxide and further a treatment of polybutadiene. Adducts of the present type which have been modified (1) with a polybutadiene, and/or (2) with a peroxide are disclosed in copending application U.S. Ser. No. 543,034 of Russell R. Koch, filed on Apr. 18, 1966. The disclosure of this application is incorporated herein by reference.

In the copending application of Russell R. Koch it is disclosed that the modification of a maleinized or fumarized adduct with a polybutadiene-peroxide combination produces a vehicle having greater hydrophilicity and that the equipment used to prepare the water solution as well as the equipment used to apply the pigmented vehicles can be cleaned with water alone. The modification of the adduct with peroxide improves the drying rate and hardness of the pigmented vehicle.

As is disclosed in the aforesaid copending application the peroxide should be added to the reaction mixture at a safe temperature. Cumene hydroperoxide should be added to the reaction mixture at a temperature from 200°–300° F., preferably 200°–275° F. The polybutadiene addition is not dependent on temperature for good results. The polybutadiene, for example, can be added at a temperature varying from room temperature to 400° F. or more. Once the peroxide has been added, the temperature of the polybutadiene addition becomes dependent upon the safe temperature of the peroxide.

The polybutadiene that is used in the process generally will have a molecular weight of from about 6,000 to about 12,000, and preferably from about 8,000 to about 10,000. The polybutadiene is normally liquid. A preferred modifying agent is stereospecific polybutadiene having a similar molecular weight. Any of the foregoing coating compositions can be prepared with or without pigments. Although the peroxide used in the examples set forth in said copending application was cumene hydroperoxide, other peroxides can be used in practicing the invention. These other peroxides include methyl ethyl ketone peroxide, dicumyl peroxide, and benzoyl peroxide, among others.

The amount of peroxide used to treat the maleic adduct may vary from about 0.25 to 5.0%, and preferably from about 0.5 to about 2.0%, based on the weight of the adduct. The amount of polybutadiene employed in the process will vary from about 0.5 to about 7.0%, and preferably from about 0.5 to about 2.0%, based on the weight of the adduct.

It has been found that the combined treatment of the vehicle with (1) a cationic exchange resin, (2) a peroxide, and (3) a polybutadiene, produces a paint vehicle having unexpected and improved properties. Such a vehicle not only has good color properties but also has good water resistance, cleanup properties, etc.

The following examples illustrates the combined treatment of the vehicle with a cation exchange resin, a peroxide, and polybutadiene.

EXAMPLE 9

Prior to the addition of butoxyethanol to the adduct prepared as described in Example 4 (except that the maleic content was 8.2% and 1% Dowex was present during the adduct stage), 0.25 part cumene hydroperoxide was added at 260°–300° F. and the batch was cooled to 250° F. whereupon 0.25 part of cumene hydroperoxide and 1 part stereospecific polybutadiene were added and thoroughly mixed. Butoxyethanol was then added to obtain 80% solids. The properties of this modified vehicle are set forth in Table II below (Product 6). Products modified by eliminating one or more of the treating agents are also disclosed in the table.

TABLE II.—IMPROVED WATER SOLUBLE ENAMEL VEHICLE

| Vehicle adduct | 1 | 2 | 3 | 4 | 5 | 6 |
|---|---|---|---|---|---|---|
| Dowex 50WX-8, percent | 0 | 0 | 1 | 1 | 1 | 1 |
| Cumene hydroperoxide, percent | 0 | 0.5 | 0 | 0 | 0.5 | 0.5 |
| Polybutadiene, percent | 0 | 1 | 0 | 1 | 0 | 1 |
| Percent solids | 86.47 | 84.19 | 82.15 | 82.10 | 81.89 | 81.67 |
| Viscosity (poises) | 41.6 | 62.7 | 40.2 | 37.8 | 30.7 | 33.1 |
| Color | 10–11 | 11–12 | 8 | 8 | 8 | 8 |
| Base ester color | 8 | 8 | 8 | 8 | 8 | 8 |
| Acid value | 53.6 | 49.2 | 56.1 | 54.3 | 50.9 | 47.8 |
| Enamel viscosity (KU) | | | 87 | 81 | 81 | 74 |

The above table shows that the improved color obtained using the cation exchange resin is maintained where the vehicle is also modified with the peroxide and polybutadiene. Additionally, the viscosity of the product is lowered as is the final enamel viscosity.

EXAMPLE 10

This example illustrates a water-soluble enamel to which the modified paint vehicles described in the present application can be added.

| | Lbs. |
|---|---|
| Titanium dioxide | 300 |
| Kaolin | 100 |
| Tetrapotassium pyrophosphate | 2 |
| Sodium pentachlorophenate | 2 |
| Water | 115 |
| Modified paint vehicle | 500 |
| Cobalt isodecanoate | 4 |
| Lead isodecanoate | 4 |
| Zinc naphthenate | 10 |
| Methylethyl ketoxime | 2 |
| Water | 40 |

Obviously many modifications and variations of the invention as hereinbefore set forth may be made without departing from the spirit and scope thereof, and therefore only such limitations should be imposed as are indicated in the appended claims.

I claim:

1. In a process for producing a paint vehicle wherein a polyol is esterified with an excess of an unsaturated fatty oil acid to form an ester and the reaction mixture is thereafter maleinized or fumarized to form an adduct, the improvement which comprises contacting the reaction mixture during at least one of the stages of reaction or between said ester formation and said adduct formation with a cation exchange resin in the hydrogen form in a color inhibiting amount of at least about 0.1% by weight, said treatment with said cation exchange resin being carried out ta a temperature within the range of 150° F. to 550° F. for a period of time sufficient to reduce color formation in the resultant product, and separating said cation exchange resin from said reaction mixture.

2. A process as claimed in claim 1 in which said cation exchange resin is added only after said esterification.

3. A process as claimed in claim 1 in which said cation exchange resin is present in said reaction mixture during said adduct formation.

4. A process as claimed in claim 1 in which said cation exchange resin is added to said reaction mixture after said ester formation, is heated with said ester to a temperature of 150° F. to 450° F. before said adduct formation, and is present during said adduct formation.

5. A process for producing a paint vehicle which comprises esterifying a resinous polyol with from about 5–50% excess of an unsaturated fatty oil acid at a temperature of from about 350°–550° F., reacting the esterified polyol with about 4–15% based on the weight of the esterified polyol of a member from the group consisting of maleic anhydride and fumaric acid to form an adduct, contacting the reaction mixture at least during the adduct formation with a color inhibiting amount of at least 0.1% by weight of a strong acid cation exchange resin in the hydrogen form, said treatment with said cation exchange resin being carried out at a temperature within the range of 150–550° F. for a period of time sufficient to reduce the color formation in the final product, and recovering the resultant product free from said cation exchange resin.

6. A process for producing a paint vehicle which comprises esterifying a resinous polyol with from about 5–50% excess of an unsaturated fatty oil acid at a temperature of from about 350–550° F., reacting the esterified polyol with about 4–15% based on the weight of the esterified polyol of a member from the group consisting of maleic anhydride and fumaric acid to form an adduct, contacting the reaction mixture during at least one of the stages of reaction or between said ester formation and said adduct formation with a cation exchange resin in the hydrogen form in a color inhibiting amount of at least about 0.1% by weight, said treatment with said cation exchange resin being carried out at a temperature within the range of 150–550° F. for a period of time sufficient to reduce color formation in the resultant product, reacting the ester-adduct with a compound selected from the group consisting of an organic peroxide and a normally liquid polybutadiene, the amount of said compound being within the range of 0.25% to 5.0% by weight in the case of the organic peroxide and 0.5% to 7.0% by weight in the case of the polybutadiene, based on the weight of said adduct, and recovering the resultant product free from said cation exchange resin.

7. A process as claimed in claim 6 in which the formed ester-adduct is reacted with 0.25% to 5.0% by weight of an organic peroxide, based on the weight of said adduct.

8. A process as claimed in claim 6 in which the formed ester-adduct is reacted with 0.5% to 7.0% by weight of a normally liquid polybutadiene based on the weight of said adduct.

9. A process as claimed in claim 6 in which the formed ester-adduct is reacted with 0.25% to 5.0% by weight of an organic peroxide, based on the weight of said adduct, and 0.5% to 7.0% by weight of a normally liquid polybutadiene based on the weight of said adduct.

10. The product produced by the process of claim 7.
11. The product produced by the process of claim 8.
12. The product produced by the process of claim 9.

References Cited

UNITED STATES PATENTS

| 2,766,273 | 10/1956 | Bruins et al. | 260—484 |
| 3,071,604 | 1/1963 | Mohan et al. | 260—410.6 |
| 3,251,790 | 5/1966 | Christenson et al. | 260—18 |
| 3,297,557 | 1/1967 | Huggard | 204—181 |
| 3,341,485 | 9/1967 | Long | 260—18 |
| 3,392,129 | 7/1968 | Hoy et al. | 260—22 |
| 3,397,159 | 8/1968 | Slater et al. | 260—18 |

DONALD E. CZAJA, Primary Examiner
R. A. WHITE, Assistant Examiner

U.S. Cl. X.R.
260—18, 23

UNITED STATES PATENT OFFICE
CERTIFICATE OF CORRECTION

Patent No. 3,511,795                                              May 12, 1970

Mary G. Brodie

It is certified that error appears in the above identified patent and that said Letters Patent are hereby corrected as shown below:

Column 2, line 1, "2 and 8 most often" should read -- 10 and 14, and --. Column 3, line 2, "thet reatment" should read -- the treatment --; line 3, "furmaric" should read -- fumaric --. Column 4, line 45, "Z-$Z_7$" should read -- $Z_6$-$Z_7$ --. Column 6, Table I, under "Adduct color", "10-14" should read -- 10-11 --; line 61, "acid, and the like." should read -- acid, linolenic acid, and the like. --. Column 7, Table II, under "6" the entire column should be corrected to read as shown below:

$$
\begin{array}{c}
1 \\
0.5 \\
1 \\
81.67 \\
33.1 \\
8 \\
8 \\
47.4 \\
79
\end{array}
$$

Signed and sealed this 29th day of September 1970.

(SEAL)
Attest:

EDWARD M. FLETCHER, JR.                          WILLIAM E. SCHUYLER, JR.
Attesting Officer                                     Commissioner of Patents